United States Patent [19]

Sakamoto

[11] Patent Number: 5,786,949

[45] Date of Patent: Jul. 28, 1998

[54] MAGNETIC TRANSFER APPARATUS INCLUDING A TAPE CLEANING ARRANGEMENT

[75] Inventor: Takeyoshi Sakamoto, Miyagi, Japan

[73] Assignee: Sony Corporation, Tokyo, Japan

[21] Appl. No.: 574,384

[22] Filed: Dec. 18, 1995

[30] Foreign Application Priority Data

Dec. 26, 1994 [JP] Japan ................... 6-337284

[51] Int. Cl.⁶ ..................................... G11B 5/86
[52] U.S. Cl. ................. 360/16; 360/130.21; 360/130.31
[58] Field of Search ..................... 360/15, 16, 17, 360/128, 130.2, 130.21, 130.3, 130.31

[56] References Cited

U.S. PATENT DOCUMENTS

| 3,091,794 | 6/1963 | Pillsbury, Jr. ............... 360/130.21 X |
| 3,608,798 | 9/1971 | Lawless ............................ 226/25 |
| 3,683,445 | 8/1972 | Hagadorn ......................... 15/308 |
| 3,893,167 | 7/1975 | Stahler ............................. 360/16 |
| 5,523,897 | 6/1996 | Nelson et al. ................... 360/16 |

FOREIGN PATENT DOCUMENTS 9417523  8/1994  WIPO .................. G11B 5/86

Primary Examiner—Andrew L. Sniezek
Attorney, Agent, or Firm—Jay H. Maioli

[57] ABSTRACT

A magnetic transfer apparatus of a video software high-speed printing system is provided with a cleaning device which prevents breakdowns of the magnetic transfer apparatus caused by magnetic powder and the like adhered to a cleaning tape by effectively removing magnetic powder and the like adhered to the cleaning tape. Slits are provided in both end flanges of a guide pole of the cleaning device and matter fallen from both edge surfaces of the cleaning tape is sucked through the slits. As a result, magnetic powder and the like fallen from both edge surfaces of both edges of the tape is effectively removed and it is possible to keep the surfaces of a mother tape and/or a blank tape clean at all times.

4 Claims, 3 Drawing Sheets

5,786,949

1

MAGNETIC TRANSFER APPARATUS INCLUDING A TAPE CLEANING ARRANGEMENT

BACKGROUND OF THE INVENTION

This invention relates to a magnetic transfer apparatus for a video software high-speed printing system.

A transfer apparatus for transferring video, audio or other information magnetically recorded on one tape (a mother tape) onto another tape (a blank tape) is disclosed in for example in U.S. Pat. No. 4,979,691.

In a video software high-speed printing system in which the above kind of transfer apparatus is used, high-speed copying of video software information magnetically recorded on a mother tape onto a blank tape is carried out by the magnetic contact printing method. In the magnetic contact printing method a mother tape and a blank tape are mutually superposed, a bias magnetic field is applied and a pattern on the mother tape is copied onto the blank tape by a high-speed printer. The process of the magnetic contact printing method can be divided into three steps: a mother tape making step, a tape copying step and a loading step.

A magnetic transfer apparatus for carrying out the tape copying step of the above-mentioned video software high-speed printing system is provided with a device for cleaning the mother tape and the blank tape by bringing these tapes into contact with a cleaning tape. Most of that which adheres to the cleaning tape of the cleaning device from the mother tape and the blank tape are magnetic powder of the blank tape and matter fallen from the surface of the tape base. Particularly, as a result of the cutting of the blank tape, a lot of magnetic powder falls onto the two edges of the cleaning tape and in some cases collection of this magnetic powder beyond a certain amount becomes impossible and the magnetic powder having been formed into lumps on the cleaning tape passes from the cleaning tape back onto the recorded tape. These lumps of magnetic powder cause large dropouts and have sometimes led to serious incidents of tape breakage including breakage of the mother tape when the lumps get caught in the tape transport system of the magnetic transfer apparatus.

SUMMARY OF THE INVENTION

Accordingly, an object of this invention is to prevent breakdowns of a magnetic transfer apparatus caused by magnetic powder and the like adhered to a cleaning tape.

Another object of the invention is to effectively remove magnetic powder and the like adhered to a cleaning tape.

The above-mentioned objects of the invention are achieved by a magnetic transfer apparatus for transferring information magnetically recorded on a mother tape onto a blank tape by a magnetic contact print method having a cleaning device for bringing a cleaning tape into contact with at least one of the mother tape and the blank tape and keeping this tape clean at all times, which comprises a guide pole provided in the cleaning device for bringing the cleaning tape into contact with at least one of a mother tape or a blank tape and having two end flanges, a slit provided in each of the end flanges of the guide pole for sucking in matter fallen from both edge surfaces of the cleaning tape, a through hole provided inside the guide pole for connection each slit, and a suction air generating apparatus connected to the through hole.

By disposing the slits behind a position where the cleaning tape moves away from at least one of a mother tape and

2 a blank tape after making contact therewith, sucking-in of magnetic powder and the like fallen from the edge surfaces of both edges of the tape can be carried out effectively.

The suction air generating apparatus can be one which generates suction air by converting pressurized air. Also, it is desirable that the suction air generating apparatus be provided with a filter for collecting sucked-in matter.

Because the slits are provided in the guide, which makes contact with at least one of the mother tape and the blank tape in the cleaning device for keeping the tape clean at all times, magnetic powder and the like fallen from both edge surfaces of the tape can be effectively removed by suction.

DETAILED DESCRIPTION OF THE PREFERRED EMBODIMENTS

An embodiment of the invention will now be described with reference to the accompanying drawings.

Figure 1:
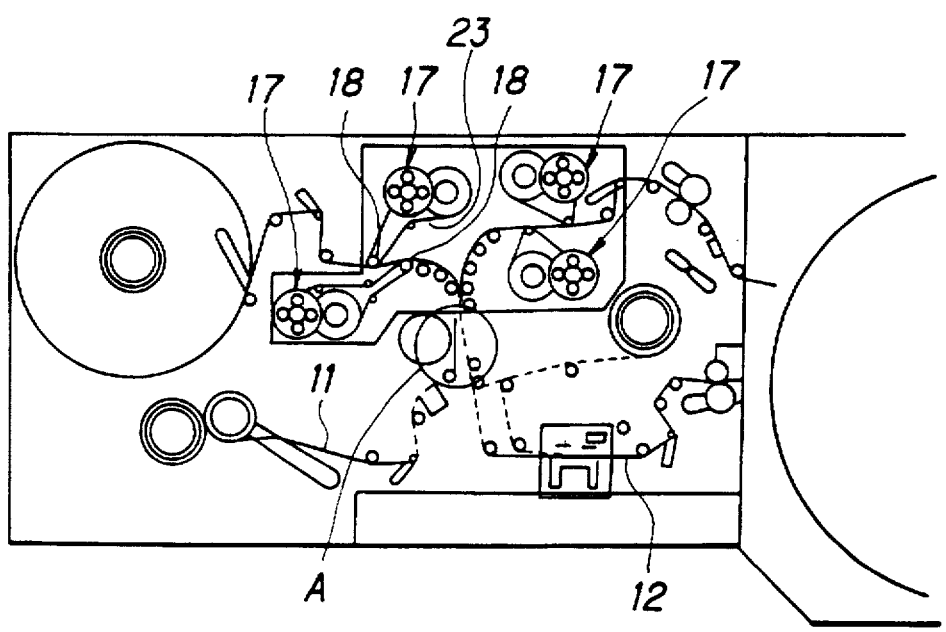
FIG. 1 is a configuration view showing the mechanical construction of a tape transport system of a magnetic transfer apparatus of a video software high-speed printing system according to an embodiment of the present invention.
Figure 2:
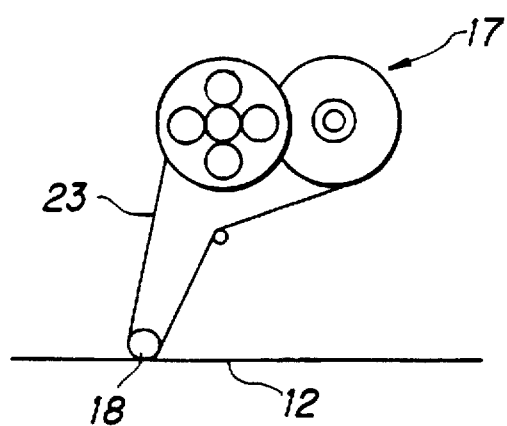
FIG. 2 is a configuration view of a cleaning device in the magnetic transfer apparatus of FIG. 1.
Figure 3:
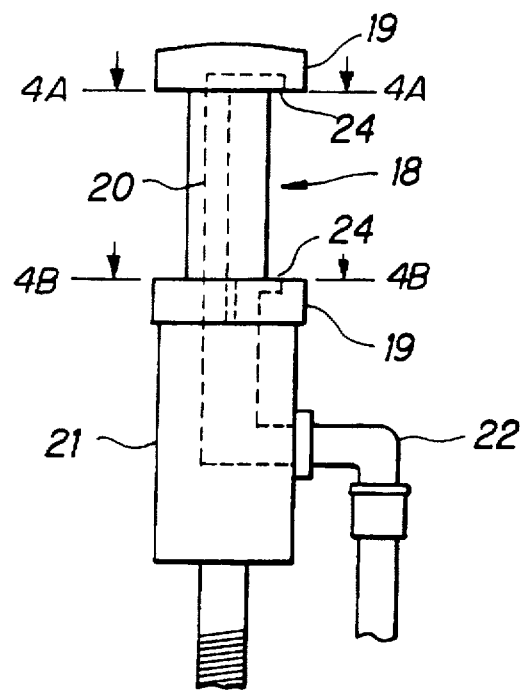
FIG. 3 is a side view of a guide pole of the cleaning device of the magnetic transfer apparatus of FIG. 1.
Figure 4A:
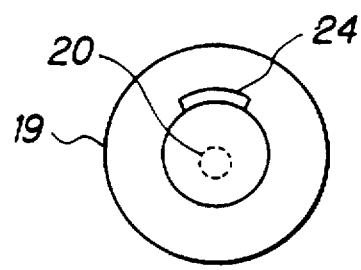
FIG. 4A is a view on the line 4A—4A of FIG. 3
Figure 4B:
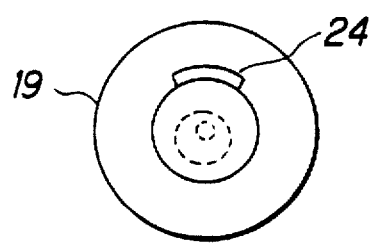
FIG. 4B is a view on the line 4B—4B of FIG. 3.
Figure 5:
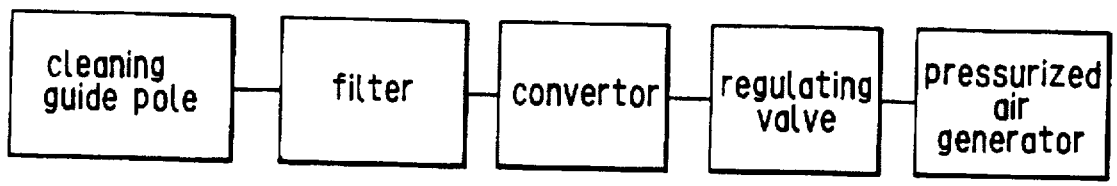
FIG. 5 is a construction diagram of parts for generating pressurized air for magnetic powder suction of the cleaning device in the magnetic transfer apparatus of FIG. 1.

FIG. 1 is a configuration view showing the mechanical construction of a tape transport system of a magnetic transfer apparatus of a video software high-speed printing system according to an embodiment of the present invention; FIG. 2 is a configuration view of a cleaning device; FIG. 3 is a side view of a guide pole; FIG. 4A is a view on the line 4A—4A of FIG. 3 and FIG. 4B is a view on the line 4B—4B of FIG. 3; FIG. 5 is a construction diagram of parts for generating pressurized air for magnetic powder suction; and FIG. 6 is a construction diagram of a video software high-speed printing system.

Figure 6:
FIG. 6 is a construction diagram of a video software high-speed printing system.

A video software high-speed printing system of this embodiment performs high-speed copying of video software by the magnetic contact printing method, and as shown in FIG. 6 the process of this printing method can be divided into three steps: a mother tape making step, a tape copying step and a loading step.

In the mother tape making step, a VTR for the mother tape and a master VTR for delivering a program to be copied are connected together and a mother tape is made by fully automatic operation. In the tape copying step, the mother tape made in the mother tape making step is loaded into a high-speed printer. A blank tape is also loaded into the high-speed printer, the magnetic surfaces of the tapes are mutually superposed on a transfer drum, air pressure is applied and they are transported while being pressed together. At the same time a bias magnetic field is applied and the pattern on the mother tape is thereby transferred inverted onto the blank tape. The blank tape after transfer is continuously taken up and sent to the loading step.

In the loading step, the printed tape made in the copying step is put in a loader and wound into a cassette shell. During this process, the loader reads a CUE signal recorded at the head of the program and automatically cuts the tape and winds it at high speed every one copy length. In this way the video software is completed.

A magnetic transfer apparatus according to this embodiment is used in the tape copying step of the video software high-speed printing system process. The mechanical construction of the tape transport system of the apparatus will now be described with reference to FIG. 1.

The principle by which a magnetic pattern on a mother tape 11 is transferred to a blank tape 12 is based on a method of magnetically transferring a fine magnetic pattern. In a high-speed printer, the magnetic surfaces of the mother tape 11 and the blank tape 12 are brought into contact and a bias magnetic field is applied. When this is done, the bias magnetic field causes the magnetic pattern on the mother tape 11 to be transferred onto the magnetic surface of the blank tape 12 (the part in the ring A of FIG. 1). The magnetic used for a mother tape 11 has the coercive force about three times of that of the blank tape 12 so that it does not demagnetize due to the bias magnetic field applied to transfer the magnetic pattern onto the blank tape 12. Currently, the coercive force of tape generally used for the blank tape 12 is about 700 oersteds, and that of the mother tape 11 is about 2000 oersteds.

The mother tape 11 and the blank tape 12 are transported at high speed and kept in close contact without becoming misaligned, and in the apparatus of this embodiment a transfer drum system (not shown in the drawings) is used to make this possible.

To clean the mother tape 11 and the blank tape 12, a number of cleaning devices 17 each having a cleaning tape 23 and a guide pole 18 are provided in a total of four locations for severally cleaning the magnetic surfaces and the base and back-coated surfaces of the mother tape 11 and the blank tape 12, a number of times and during tape travel the cleaning devices 17 each clean a different respective tape surface. The cleaning tapes 23 are each fed from a supply reel to a takeup reel at a rate of about 5 mm per 250 m of travel of the mother tape 11 and the blank tape 12.

As shown in FIG. 2, each cleaning device 17 has a guide pole 18 for guiding the travel of the cleaning tape 23, and a characteristic feature of this invention is the structure of this guide pole 18. That is, as shown in FIG. 3, slits 24, as shown in FIGS. 4A and 4B, are provided in both flanges 19 of the guide pole 18.

These slits 24 are connected to a through hole 20 passing axially through the central part of the guide pole 18, and the through hole 20 is connected to a suction branch pipe 22 for provided in the pipe wall of a guide pole seat 21. As a result, magnetic powder and the like that has fallen from both edge surfaces of the respective tape is sucked into the slits 24 and removed through the branch pipe 22 and an air hose not shown in the drawings. The slits 24 of the guide pole 18 are disposed behind the position where the cleaning tape 23 moves away from the mother tape 11 or the blank tape 12 after making contact therewith. The slits 24 are of a width such that they do not affect the travel of the tapes.

The amount of magnetic powder falling onto the cleaning tape 23 differs depending on the maker of the tape used in the magnetic transfer apparatus, but with tapes of all makers the magnetic powder concentrates at both edge surfaces of the tape. Therefore, according to the embodiment described above, it is possible to remove magnetic powder falling from both edge surfaces of the tape by suction and prevent it from re-adhering to the tape surface, so that serious trouble such as breaking of the tape caused by lumps of magnetic powder can be prevented and the reliability of the magnetic transfer apparatus can be improved.

Flow of air for sucking the magnetic powder is generated by converting pressurized air used elsewhere in the magnetic transfer apparatus. Also, the suction force thereof can be changed freely by changing the pressure of the pressurized air, and a suction force can be set so as to be suitable for the blank tape 12. A suction air pipe system diagram of the embodiment is shown in FIG. 5.

In this embodiment, as shown in FIG. 5, because magnetic powder and the like is collected by suction, sucked-in magnetic powder and the like can be collected by a filter and prevented from being scattered in the vicinity of the transfer apparatus.

According to the present invention, because it is possible to remove magnetic powder fallen from both edge surfaces of a tape by suction through slits provided in a guide pole of a cleaning device, it is possible to keep a mother tape and/or a blank tape for copying clean at all times.

What is claimed is:

1. A cleaning device for a magnetic transfer apparatus transferring information magnetically recorded on a mother tape onto a blank tape by a magnetic contact print method for bringing a cleaning tape into contact with at least one of the mother tape and the blank tape and keeping the contacted tape clean at all times, the cleaning device comprising;

a guide pole for bringing a cleaning tape into contact with at least one of a mother tape and a blank tape, the guide pole having two end flanges;

a slit provided in each of the end flanges of the guide pole and arranged so that matter fallen from both edge surfaces of the cleaning tape can be sucked thereinto;

a through channel provided inside the guide pole for connecting each said slit; and a source of air suction connected to the through channel.

2. A cleaning device according to claim 1, wherein each said slit is disposed behind a position where the cleaning tape moves away from at least one of the mother tape and the blank tape after making contact therewith.

3. A cleaning device according to claim 1, wherein the source of suction air produces suction air by converting pressurized air.

4. A cleaning device according to claim 1, wherein the source of suction air is provided with a filter for collecting sucked-in matter.

* * * * *